Patented May 21, 1929.

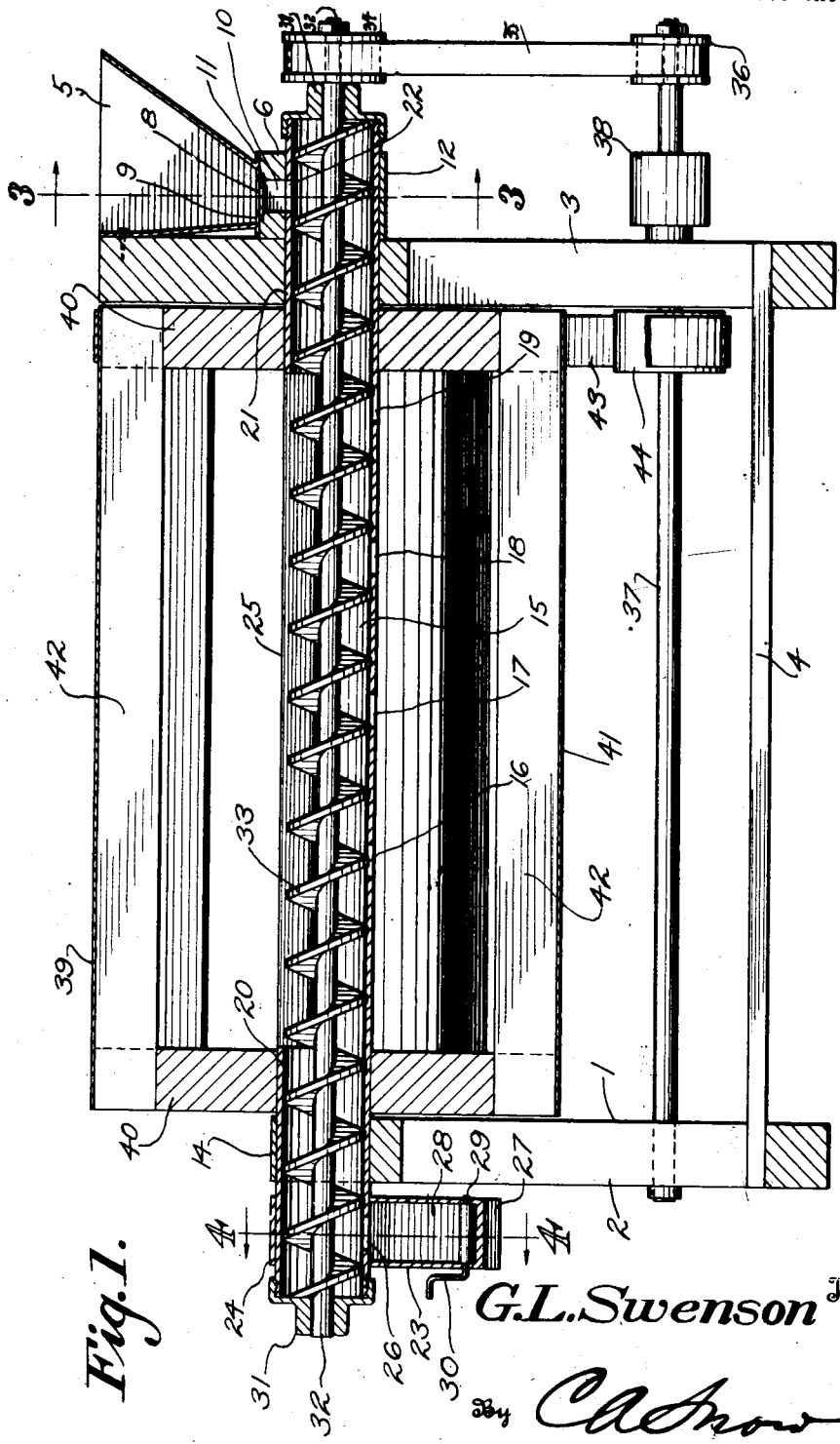

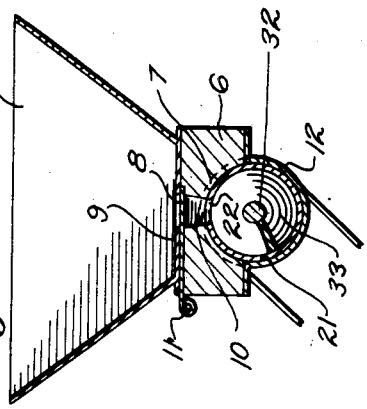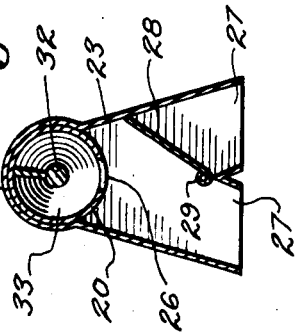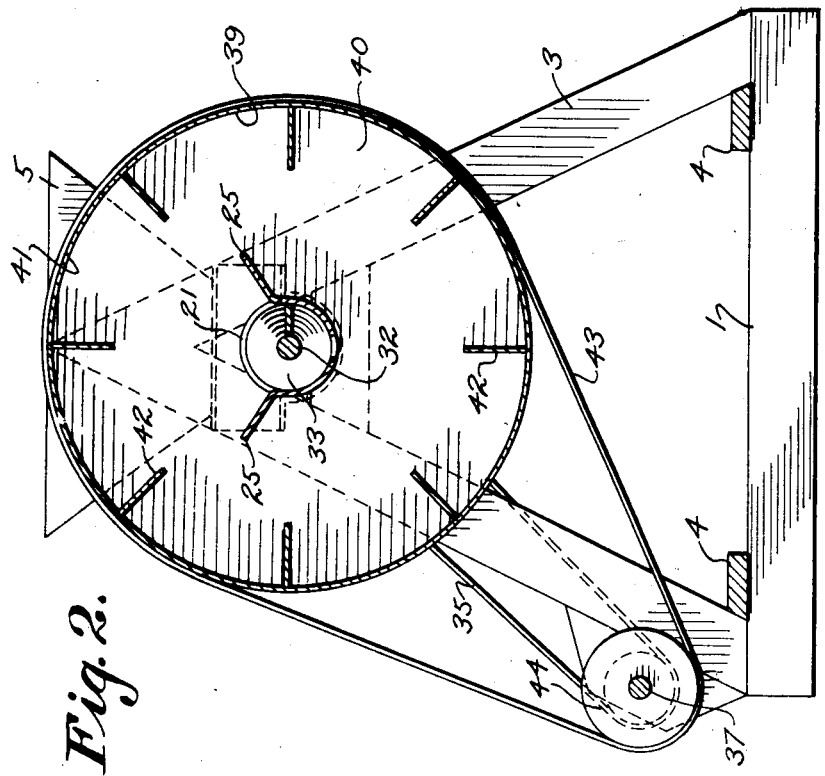

1,713,568

UNITED STATES PATENT OFFICE.

GUS L. SWENSON, OF COLVILLE, WASHINGTON.

FORCE-FEED SEED-TREATING MACHINE.

Application filed April 20, 1927. Serial No. 185,217.

This invention aims to provide a novel machine for treating seed with powder or other substance, and one object of the invention is to provide novel means whereby the seed and the powder are forced along positively through the machine, the action of the machine being more rapid than is the action of a machine wherein gravity is relied upon to carry the seed along.

Another object of the invention is to provide novel means whereby the seed and the powder will be handled repeatedly, so that the seed will be thoroughly coated.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in vertical longitudinal section, a machine constructed in accordance with the invention;

Figure 2 is a transverse section of the machine;

Figure 3 is section taken approximately on the line 3—3 of Figure 1;

Figure 4 is a section taken approximately on the line 4—4 of Figure 1.

In carrying out the invention, there is provided a support 1 of any desired kind, the support comprising, if desired, end frames 2 and 3 united by rigid connections 4. The numeral 5 marks a hopper which is secured to the end frame 3. The hopper 5 is mounted on a bracket 6, in the form of a block, the bracket being secured to the end frame 3. In its lower edge, the bracket 6 has a concave seat 7, as shown in Figure 3. There is an opening 8 in the bottom 9 of the hopper 5, and the opening 8 is alined with a passage 10 in the bracket 6. A gate 11 slides in the bracket 6 below the bottom 9 of the hopper 5, and controls the opening 8. There is a retaining strap 12 on the bottom of the bracket 6. A retaining strap 14 is mounted on the upper end of the part 2 of the frame 1.

A trough or receiver 15 is located between the end frames 2 and 3 and is provided with openings 19, 16, 17, and 18, spaced apart longitudinally of the trough 15 and located in the bottom of the trough. There may be any desired number of the aforesaid openings. The trough or receiver 15 has flaring sides 25. The trough 15 is supplied with tubular ends 20 and 21, the end 20 of the trough being held on the member 2 of the support 1, rigidly, by means of the retaining strap 14. The retaining strap 12 holds the tubular end 21 of the trough 15 in the seat 7 that is formed in the lower end of the bracket 6, and the end 21 of the trough passes through the part 3 of the support 1, as shown in Figure 1. The construction is such that the trough 15 is fixedly mounted in the support 1. There is an opening 22 in the tubular end 21 of the trough 15, the opening 22 being in communication with the passage 10 in the bracket 6.

The numeral 23 denotes an outlet member provided at its upper end with a hanger 24 extended about the tubular end 20 of the trough 15, and constituting means whereby the outlet member is fixedly mounted on the end 20, externally of the part 2 of the support 1. The end 20 of the trough 15 has an opening 26 that discharges into the outlet member 23. As shown in Figure 4 of the drawings, the outlet member 23 has spouts 27 located side by side, either spout being adapted to be closed, at the will of an operator, by means of a valve 28 secured by a shaft 29 mounted to rock in the outlet member 23, the shaft 29 being operated through the instrumentality of an external crank 30, or in any other suitable way.

There are bearings 31 on the end members 20 and 21 of the trough 15, and in the bearings 31, the shaft 32 of a worm conveyor 33 is mounted to rotate, the worm conveyor 33 being located in the trough 15, and in the ends 20 and 21 of the trough. There is a pulley 34 on the shaft 32, the pulley being located adjacent to the hopper 5. A belt 35 is engaged about the pulley 34, the belt engaging a pulley 36 on a drive shaft 37, the drive shaft being mounted to rotate on the end frames 3 and 2 of the support 1. Power is transmitted to the shaft 37 in any suitable way, for instance by a pulley 38 on the shaft.

The numeral 39 designates a drum located between the end frames 2 and 3 and including heads 40 and a shell 41 of cylindrical form connecting the heads. The heads 40 of the drum 39 are rotatably mounted on the ends 20 and 21 of the trough 15. Elevators 42, in the form of strips, extend longitudinally of the shell 41 of the drum 39, within the drum, and are mounted at their ends in the heads 40 of the drum. About one end of the drum 39 is engaged a belt 43 cooperating with a pulley 44 on the drive shaft 37.

In practical operation, rotation is imparted to the shaft 37 by way of the pulley 38 or its equivalent, and from the shaft 37, rotation is imparted to the shaft 32, and the worm conveyor 33 by means of the pulley 36, the belt 35, and the pulley 34. When rotation is imparted to the shaft 37, the drum 39 is caused to rotate on the ends 20 and 21 of the trough 15, through the instrumentality of the belt 43 and the pulley 44.

The seed which is to be treated, and the powder wherewith the seed is to be treated, are placed in the hopper 5, and flow into the tubular end 21 of the trough 15, by way of the opening 8, the passage 10, and the opening 22, under the governance of the gate 11. The worm conveyor 33 advances the material along the trough 15. The material drops first through the opening 19 into the drum 39. As the drum is rotated, the seed and the powder are picked up by the elevator strips 42 and are dropped again into the trough 15. The worm conveyor 33 advances the material to the opening 18, where the operation above described is repeated, and in the same way, the aforesaid operation is carried out at the openings 17 and 16. In this way, there is a thorough mixing of the seed and the powder, and the seed is thoroughly treated and adequately covered. Ultimately, the worm conveyor 33 carries the seed into the end 20 of the trough 15, and by way of the opening 26, the seed passes into the outlet member 23. The seed may pass out through either of the spouts 27, depending upon how the valve 28 is placed, and it is possible to have two bags going at once, one bag being removed as it is filled, and the valve 28 being manipulated to shunt the falling seed over into the other spout 27. The construction of the machine is such that it can be operated at slow speed, and at the same time, a high out-put can be secured, because the seed is positively advanced and forced along in the trough 15, by the action of the worm conveyor 33.

What is claimed is:—

In a machine of the class described, a support, a trough having tubular ends mounted on the support, one of said ends having an inlet, and the other of said ends having an outlet, a conveyor movable in the trough and constituting means for carrying the material from the inlet to the outlet, an elevating drum comprising a shell and heads carrying the shell, the heads being mounted for rotation upon the tubular ends of the trough, the trough having a plurality of small openings spaced apart longitudinally of the trough and discharging into the drum, the trough being open at the top, throughout the entire distance between the heads of the drum, the trough being provided on its upper edges with outwardly diverging sides extended the full distance between the heads of the drum, means for rotating the drum, inwardly extended elevator strips disposed against the shell and extending the full distance between the heads, and means for operating the conveyor.

In testimony that I claim the foregoing as my own, I have hereto affixed my signature.

GUS L. SWENSON.